(12) United States Patent
Spadaccini et al.

(10) Patent No.: US 7,377,112 B2
(45) Date of Patent: May 27, 2008

(54) FUEL DEOXYGENATION FOR IMPROVED COMBUSTION PERFORMANCE

(75) Inventors: Louis Spadaccini, Manchester, CT (US); Catalin Fotache, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 385 days.

(21) Appl. No.: 11/158,498

(22) Filed: Jun. 22, 2005

(65) Prior Publication Data

US 2007/0006591 A1    Jan. 11, 2007

(51) Int. Cl.
*F02C 7/224* (2006.01)

(52) U.S. Cl. .................... 60/772; 60/736; 431/356

(58) Field of Classification Search ............. 60/39.091, 60/734, 736, 772, 776, 779; 431/11, 253, 431/356
See application file for complete search history.

(56) References Cited

U.S. PATENT DOCUMENTS

| | | |
|---|---|---|
| 4,371,385 A | 2/1983 | Johnson |
| 4,448,176 A | 5/1984 | Hoppie |
| 4,516,984 A | 5/1985 | Warner et al. |
| 4,602,923 A | 7/1986 | Bernstein |
| 4,729,773 A | 3/1988 | Shirato et al. |
| 4,955,992 A | 9/1990 | Goodale et al. |
| 5,053,060 A | 10/1991 | Kopf-Sill et al. |
| 5,078,755 A | 1/1992 | Tozawa et al. |
| 5,123,937 A | 6/1992 | Shibata et al. |
| 5,154,832 A | 10/1992 | Yamamura et al. |
| 5,165,224 A | 11/1992 | Spadaccini et al. |
| 5,340,384 A | 8/1994 | Sims |
| 5,410,052 A | 4/1995 | Smith et al. |
| 5,482,860 A | 1/1996 | Copeland et al. |
| 5,522,917 A | 6/1996 | Honda et al. |
| 5,693,122 A | 12/1997 | Berndt |
| 5,695,545 A | 12/1997 | Cho et al. |
| 5,888,275 A | 3/1999 | Hamasaki et al. |
| 5,902,382 A | 5/1999 | Campain et al. |
| 5,902,747 A | 5/1999 | Nemser et al. |
| 6,106,591 A | 8/2000 | Keskar et al. |
| 6,168,648 B1 | 1/2001 | Ootani et al. |
| 6,176,087 B1 | 1/2001 | Snyder et al. |
| 6,258,154 B1 | 7/2001 | Berndt et al. |
| 6,309,444 B1 | 10/2001 | Sims et al. |
| 6,315,815 B1 | 11/2001 | Spadaccini et al. |
| 6,379,796 B1 | 4/2002 | Uenishi et al. |
| 6,402,810 B1 | 6/2002 | Mayer et al. |
| 6,402,818 B1 | 6/2002 | Sengupta |
| 6,494,938 B2 | 12/2002 | Sims et al. |

(Continued)

FOREIGN PATENT DOCUMENTS

EP    0273267    7/1888

(Continued)

*Primary Examiner*—L. J. Casaregola
(74) *Attorney, Agent, or Firm*—Carlson, Gaskey & Olds

(57) ABSTRACT

A method and device of this invention includes a fuel deoxygenator and a heating device for removing dissolved oxygen from fuel and then heating that fuel to a temperature above the temperature that would otherwise produce undesirable insoluble materials from a hydrocarbon fuel. The temperature of the fuel and the amount of dissolved oxygen that is removed from the fuel are adjusted according to the combustion process and optimization of desired combustion characteristics.

14 Claims, 1 Drawing Sheet

U.S. PATENT DOCUMENTS

| | | |
|---|---|---|
| 6,616,841 B2 | 9/2003 | Cho et al. |
| 6,623,637 B1 | 9/2003 | Monzen et al. |
| 6,682,016 B1 | 1/2004 | Peroulakis |
| 6,939,392 B2 * | 9/2005 | Huang et al. .................. 95/46 |
| 7,260,926 B2 * | 8/2007 | Sabatino et al. .............. 60/206 |
| 2001/0035093 A1 | 11/2001 | Yokota |
| 2002/0195385 A1 | 12/2002 | Cho et al. |
| 2003/0116015 A1 | 6/2003 | Sengupta et al. |
| 2003/0148164 A1 | 8/2003 | Koch et al. |
| 2003/0151156 A1 | 8/2003 | Crumm et al. |
| 2003/0161785 A1 | 8/2003 | Dieckmann |
| 2003/0219637 A1 | 11/2003 | Coors |
| 2004/0025696 A1 | 2/2004 | Varrin, Jr. et al. |
| 2004/0028988 A1 | 2/2004 | Bunker |
| 2004/0050786 A1 | 3/2004 | Dey et al. |
| 2004/0094463 A1 | 5/2004 | Laverdiere et al. |
| 2006/0263277 A1 * | 11/2006 | Tillman et al. ............. 422/188 |

FOREIGN PATENT DOCUMENTS

| | | |
|---|---|---|
| EP | 0354797 | 2/1990 |
| EP | 0460512 | 12/1991 |
| EP | 0493869 | 7/1992 |
| EP | 0552090 | 7/1993 |
| EP | 0576677 | 1/1994 |
| EP | 0583748 | 2/1994 |
| EP | 0622475 | 11/1994 |
| EP | 0750322 | 12/1996 |
| EP | 0963229 | 2/1998 |
| EP | 0970738 | 1/2000 |
| EP | 1018353 | 7/2000 |
| EP | 1052011 | 11/2000 |
| EP | 1210971 | 6/2002 |
| EP | 1239189 | 9/2002 |
| EP | 1270063 | 1/2003 |
| EP | 1277504 | 1/2003 |
| JP | 63151307 | 6/1988 |
| JP | 3169304 | 7/1991 |
| JP | 3193106 | 8/1991 |
| JP | 5084474 | 4/1993 |
| JP | 5317605 | 12/1993 |
| JP | 7080205 | 3/1995 |
| JP | 7227504 | 8/1995 |
| JP | 8000906 | 1/1996 |
| JP | 8332306 | 12/1996 |
| JP | 10174803 | 6/1998 |
| JP | 10216404 | 8/1998 |
| JP | 11009902 | 1/1999 |
| JP | 11033373 | 2/1999 |
| JP | 11244607 | 9/1999 |
| JP | 2000051606 | 2/2000 |
| JP | 2000084368 | 3/2000 |
| JP | 20000140505 | 5/2000 |
| JP | 20000262871 | 9/2000 |
| JP | 2000288366 | 10/2000 |
| JP | 2000350902 | 12/2000 |
| JP | 2003010604 | 1/2003 |
| JP | 2003062403 | 3/2003 |
| JP | 2003200024 | 7/2003 |
| JP | 2003245525 | 9/2003 |
| WO | WO 94/16800 | 8/1994 |
| WO | WO 97/02190 | 1/1997 |
| WO | WO 98/34709 | 8/1998 |
| WO | WO 99/39811 | 8/1999 |
| WO | WO 00/44479 | 8/2000 |
| WO | WO 00/44482 | 8/2000 |
| WO | WO 02/062446 | 8/2002 |
| WO | WO 03/029744 | 4/2003 |
| WO | WO 03/036747 | 5/2003 |
| WO | WO 03/080228 | 10/2003 |
| WO | WO 03/086573 | 10/2003 |
| WO | WO 2004/007060 | 1/2004 |
| WO | WO 2004/041397 | 5/2004 |

* cited by examiner

FUEL DEOXYGENATION FOR IMPROVED COMBUSTION PERFORMANCE

BACKGROUND OF THE INVENTION

This invention relates generally to a method and system for improving combustion. More particularly, this invention relates to a method utilizing a deoxygenating device for removing dissolved oxygen to enable fuel preheating for improved combustion performance.

An energy conversion device that utilizes a liquid hydrocarbon fuel can benefit from pre-heating fuel prior to the combustion process. Increasing fuel temperature improves fuel atomization and vaporization characteristics by reducing the time required to vaporize the fuel. Reduced vaporization times can potentially provide reductions in mixing and combustion times. Improved mixing and vaporization of fuel prior to combustion can improve combustion efficiency and flame stabilization, as well as reduce the emission of nitrogen oxides, carbon monoxide, unburned hydrocarbons, and particulates. Further, heating the fuel can favorably alter the composition of fuel by initiating desirable cracking reactions. These are all examples of the impact and advantages that pre-heating of a hydrocarbon fuel can have on a combustion process.

Disadvantageously, the temperature at which a hydrocarbon fuel may be heated is limited by the formation of insoluble products referred to as "coke". Formation of such insoluble products occurs when oxygen containing hydrocarbon fuel is heated beyond a certain temperature, such as, for examples above 350° F. Such insoluble products can potentially undesirably affect portions of a fuel system. The formation of coke deposits is dependent on the amount of dissolved oxygen present within the fuel due to prior exposure to air. The generation of insoluble products in a fuel due to dissolved oxygen has thus far prevented pre-heating of fuel to levels that desirably improve the combustion process.

Removing dissolved oxygen from a hydrocarbon fuel is known to substantially decrease the formation of undesirable insoluble products. U.S. Pat. Nos. 6,315,815 and 6,709,492 assigned to Applicant disclose devices for removing dissolved oxygen using a gas-permeable membrane. As fuel passes along the permeable membrane, oxygen molecules in the fuel diffuse out of the fuel across the gas-permeable membrane. An oxygen partial pressure differential across the permeable membrane drives oxygen from the fuel, which is unaffected and passes over the membrane.

Accordingly, it is desirable to develop a method and system for improving a combustion process that removes dissolved oxygen from the fuel providing for pre-heating of fuel to temperatures that desirably improve combustion.

SUMMARY OF THE INVENTION

This invention is a method and device for improving combustion utilizing a fuel deoxygenator to remove dissolved oxygen from a hydrocarbon fuel.

An example method and system according to this invention utilizes a fuel-deoxygenating device to remove a desired amount of dissolved oxygen from a hydrocarbon fuel. The hydrocarbon fuel may then be heated to a temperature that either vaporizes the fuel or elevates liquid fuel to a temperature that improves combustion. The removal of dissolved oxygen from the fuel prevents the formation of insoluble materials thereby providing for the elevation of the fuel to temperatures otherwise not practical.

The example method and system of this invention includes a temperature sensor and an oxygen sensor for monitoring fuel conditions. A controller communicating with the temperature sensor and the oxygen sensor modifies performance of the fuel deoxygenator responsive to desired combustion characteristics. Modification and adjustment of deoxygenator performance provides for modification and tailoring of the combustion process responsive to changing operating conditions.

Accordingly, the method and system of this invention provides for the improvement of the combustion process by tailoring fuel characteristics to desired combustion properties.

These and other features of the present invention can be best understood from the following specification and drawings, the following of which is a brief description.

DETAILED DESCRIPTION OF THE PREFERRED EMBODIMENT

Figure 1:
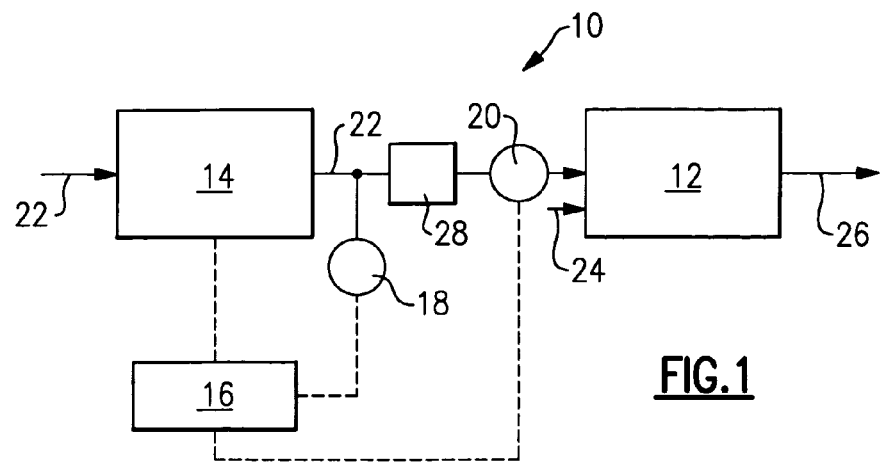
FIG. 1 is a schematic illustration of an example system according to this invention.

Referring to FIG. 1, a system 10 according to this invention includes a combustion device 12 and a fuel deoxygenator 14. Fuel 22 including some portion of dissolved oxygen enters the fuel deoxygenator 14 at an initial temperature. The initial temperature is such that undesirable insoluble materials or "coke" formation does not occur given the amount of dissolved oxygen present within the fuel 22. A controller 16 receives information from a temperature sensor 20 and an $O_2$ sensor 18. The temperature sensor 20 provides fuel temperature information that is utilized to determine the amount of dissolved oxygen that should be removed from the fuel 22 to prevent formation of "coke" deposits.

Once dissolved oxygen has been removed from the fuel 22 a heating device 28 communicates heat to the fuel 22 to elevate the fuel 22 to a desired temperature. Air 24 and fuel 22 mix either before entering the combustion device 12 or within the combustion device 12. The combustion device 12 is represented schematically and may be of any configuration known to a worker skilled in the art such as for example, a combustor for a gas turbine engine commonly used in aircraft and power generating applications or a combustion chamber within a reciprocating engine commonly used for an automobile.

Operation of the system 10 proceeds by removing a desired amount of dissolved oxygen from the fuel 22 with the deoxygenator 14. Deoxygenated fuel 22 exits the deoxygenator 14 and enters the heating device 28. In the heating device 28, the fuel 22 is elevated to a temperature determined to provide a desired combustion characteristic. The temperature of the fuel 22 can be utilized to modify emission content, and flame stability within the combustor. Further, other properties such as burn temperatures, and mixing times can be modified and adjusted through adjustment of fuel temperature.

As the fuel temperature changes, the amount of dissolved oxygen that is allowable changes. As the fuel temperature decreases the amount of dissolved oxygen that can be present within the fuel without causing undesirable generation of by-products increases. Conversely, as fuel temperature increases, the amount of dissolved oxygen allowable decreases. The controller 16 therefore controls the deoxygenator 14, for example, by controlling the pressure on the vacuum side of the membrane, or the temperature of the fuel, or the fuel flow rate to assure that dissolved oxygen content within the fuel is within desired limits based on the fuel temperature.

The amount of dissolved oxygen within the fuel 22 is monitored continuously by the oxygen sensor 18. The continual monitoring and adjusting of the fuel deoxygenator 14 and heating device 28 provides for a continuous tailoring of fuel temperature and vaporization levels to the combustion device 12.

The fuel 22 can be elevated to temperatures that vaporize a portion of the fuel to improve mixing within the combustion device 12. As appreciated, vaporization of liquid fuel 22 prior to combustion improves mixing with the air 24 required for combustion, which, in turn, can shorten the time required to ignite and burn the fuel air mixture within the combustion device. Further, vaporization and pre-mixing of fuel 22 prior to combustion can reduce emissions such as nitrogen oxides, carbon monoxide, unburned hydrocarbons and other particulates. Additionally, vaporizing at least a portion of the fuel 22 prior to ignition can reduce ignition delay times, which, in turn, provide better flame stabilization within the combustion device 12. Such improvements provide for the use of simpler ignition systems and reduced size requirements for the combustion device 12.

Figure 2:
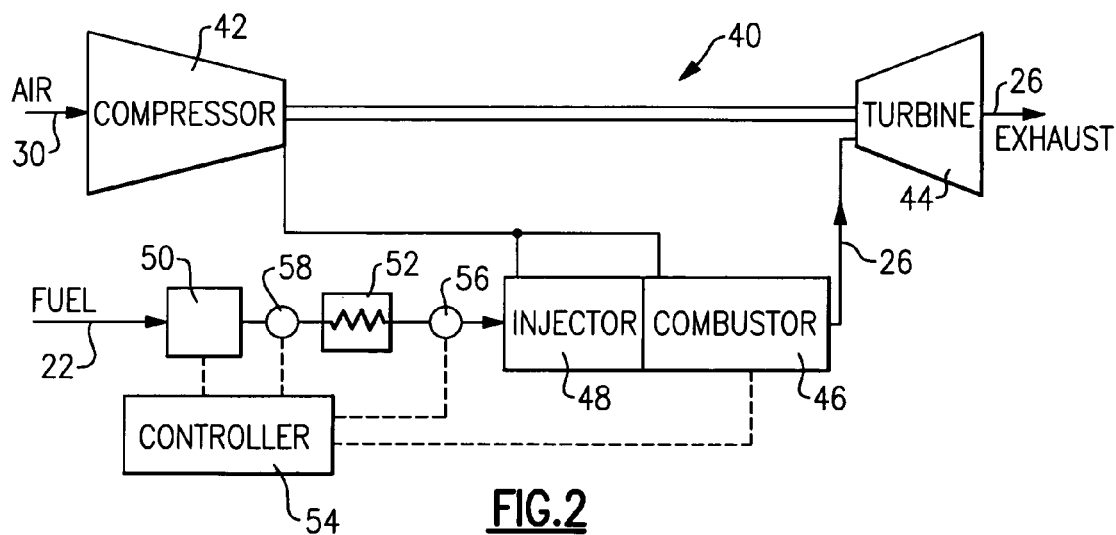
FIG. 2 is another schematic illustration of another example system according to this invention.

Referring to FIG. 2, a gas turbine engine 40 is illustrated schematically and includes a compressor 42 that draws in air 30. The air 30 is compressed and sent to an injector 48 and the combustor 46. The injector 48 injects the fuel into a combustor 46. A portion of the air may be added within the injector to achieve partial premixing. The combustor 46 ignites the air/fuel mixture and generates an exhaust stream 26 that is flowed through a turbine 44. The turbine 44 in turn drives the compressor 42.

The gas turbine engine 40 includes a fuel deoxygenator 50 and a heat exchanger 52. The fuel deoxygenator 50 and heat exchanger 52 correspond and work in concert to provide fuel 22 into the injector 48 in a state that will optimize combustion within the combustor 46. The gas turbine engine 40 also includes a controller 54 that is in communication with the combustor 46, a temperature sensor 56, and an oxygen sensor 58, along with the fuel deoxygenator 50 and the heat exchanger 52. The fuel 22 can be elevated to a temperature above its critical point. Injection of a supercritical fluid into a sub or supercritical environment can lead to faster mixing and larger spread angles, similar to those obtained when injecting a gas. Consequently, the combustor may operate with improved efficiency (pattern factor), lowr emissions, and increased stability/blow-off margin.

The combustor 46 operates at optimal efficiency with differing temperatures and vaporization levels of fuels for different operating conditions. The controller 54 continuously adjusts the fuel temperature that is provided to the injector 48. Fuel 22 entering the fuel deoxygenator 50 is at a temperature and pressure that is not conducive to the formation of undesirable byproducts and coking. After the fuel has exited the fuel deoxygenator 50, it includes substantially less dissolved oxygen. Because the fuel 22 no longer includes a significant amount of dissolved oxygen, it may be heated within the heat exchanger 52 to temperatures above those that would cause and generate insoluble materials and coking.

Heating of a typical jet fuel formulation to temperatures in excess of 400° F. causes the formation of coke and other undesirable insoluble materials. Therefore, such jet fuel is not heating above these temperatures to prevent creating undesirable levels of insoluble materials. However, removing a substantial amount of dissolved oxygen provides for heating of the fuel to temperatures in excess of 400° F.

Heating of fuel in excess of "coking" temperatures provides for the vaporization of the fuel to improve mixing with the air 30 using the injector 48. The improved mixing improves the combustion process by providing a more stable and quicker ignition and complete burn of the hydrocarbon fuel. Further, vaporization of the fuel allows for more evenly and efficiently distributed release of energy within the combustor 46, along with improved flame stability/lean blow-off margin. Better pre-mixing and reduced vaporization time provide increased combustion efficiency as well as reduced emissions of nitrogen oxides, carbon monoxide, unburned hydrocarbons, and particulates. Additionally, fuel heating leads to reduced ignition delay times that in turn apply better flame stabilization simplification of the ignition system and reduction in combustor size.

During operation, the controller 54 continually adjusts the amount of dissolved oxygen that is removed from fuel 22 by the deoxygenator 50. The amount of dissolved oxygen is determined based on the desired combustion characteristics. Such combustion characteristics can include a level of premixing or vaporization of fuel within the combustor 46 or may also include a level of certain emissions that are exhausted from the combustor 46. The controller 54 can tailor the specific fuel temperature supplied to the injector 48. The specific fuel temperature is tailored such that the heat exchanger 52 is able to heat that fuel to the temperature without producing undesirable insoluble materials and coke.

Figure 3:
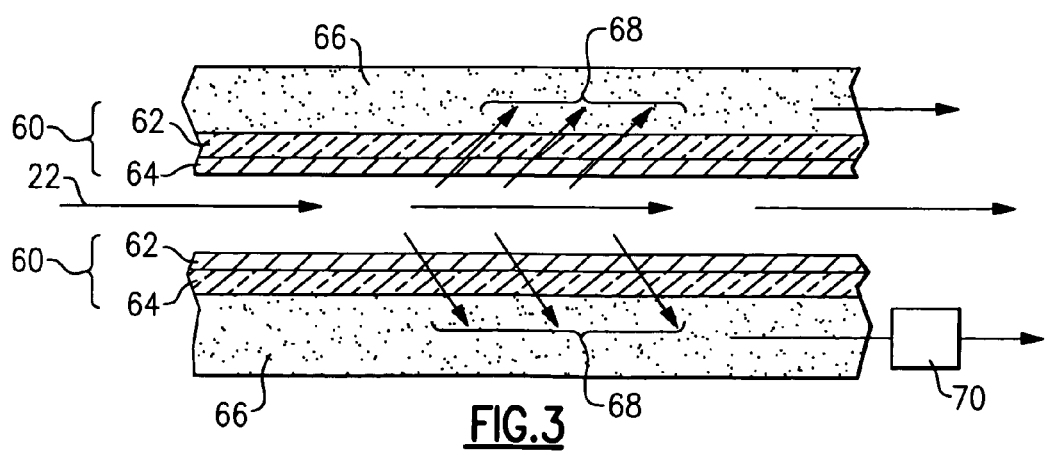
FIG. 3 is a schematic illustration of a permeable membrane for removing dissolved oxygen according to this invention.

Referring to FIG. 3, a schematic illustration of an example permeable membrane 60 disposed within the fuel deoxygenator 50 is shown. The fuel 22 flows through a passage comprised of walls formed by several permeable membranes 60. The permeable membrane 60 is comprised of a permeable layer 62 adhered to a porous backing 64. The permeable layer 62 and porous backing 64 are supported along a porous substrate 66. A vacuum source 70 draws an oxygen partial pressure differential across the permeable membrane 60 such that dissolved oxygen 68 is driven from the fuel 22 on a continual basis. The dissolved oxygen is then exhausted overboard or to other systems that may utilize it.

The porous backing 64 provides the required support structure for the permeable layer 62 while still allowing maximum oxygen diffusion from the fuel. The permeable layer 62 is coated on the porous backing 64 and a mechanical bond between the two is formed. The permeable layer 64 is preferably a 0.5-20 μm thick coating of Teflon AF 2400 over a 0.005 inch thick porous backing 64 of polyetherimide (PEI) with a 0.25 μm pore size. As appreciated different supports of different material thickness and pore size can be used to provide the requisite strength and openness. The permeable layer 62 is Dupont Teflon AF Amorphous Fluoropolymer, however other materials known to those skilled in the art are within the contemplation of this invention such as Solvay Hyflon AD perfluorinated glassy polymer, and Asahi glass CYTOP, polyperfluorobutenyl vinyl ether. Each composite permeable membrane is supported on the porous substrate 66. The porous substrate 66 is in communication with the vacuum 72 to create the desired and required oxygen partial pressure differential across the permeable membrane 60. The controller 54 can adjust the oxygen partial pressure differential to adjust how much oxygen is removed from the fuel.

Although an example of a permeable membrane is illustrated, it should be understood that it is within the compilation of this invention that other permeable membranes and structures as are known to a worker skilled in the art are within the contemplation of this invention.

Accordingly, the current invention utilizes a fuel deoxygenator having a permeable membrane to remove dissolved oxygen from fuel to improve the combustion process by allowing for increased temperature of fuel entering the combustor. Fuel heated above temperatures that otherwise would produce undesirable insoluble by-products provide for the improved combustion of hydrocarbon fuel.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of controlling a combustion process comprising the steps of:
    a) removing dissolved oxygen from a fuel at a first temperature;
    b) heating the fuel to a desired temperature prior to the fuel entering a combustion device, wherein said desired temperature is greater than said first temperature; and
    c) controlling the amount of dissolved oxygen removed relative to a selected combustion characteristic.

2. The method as recited in claim 1, wherein said combustion characteristic comprises a quantity of a substance exhausted from the combustion device.

3. The method as recited in claim 1 wherein said step c) includes controlling an amount of dissolved oxygen removed from the fuel based on a desired temperature of the fuel.

4. The method as recited in claim 1 wherein said step b) includes bringing to a supercritical state at least a portion of the fuel.

5. The method as recited in claim 1 wherein said step a) includes removing an amount of dissolved oxygen from the fuel to prevent the formation of undesirable insoluble by-products responsive to a desired temperature of the hydrocarbon fuel.

6. The method as recited in claim 1, including monitoring dissolved oxygen content within the fuel and adjusting a deoxygenating device based on the monitored dissolved oxygen content to obtain a desired dissolved oxygen content.

7. The method as recited in claim 1, including adjusting a temperature at which a deoxygenating device operates to modify the amount of dissolved oxygen removed from the fuel.

8. The method as recited in claim 1, including adjusting a partial oxygen pressure differential of a deoxygenating device to modify the amount of dissolved oxygen removed from the fuel.

9. A fuel system for an energy conversion device comprising:
    a combustion device for extracting energy from a fuel;
    a heating device for heating the fuel prior to entering said combustion device;
    a fuel deoxygenator for removing dissolved oxygen from the fuel prior to heating; and
    a controller for controlling said fuel deoxygenator to adjust a desired combustion characteristic.

10. The system as recited in claim 9, wherein said controller adjusts the amount of dissolved oxygen removal provided by the fuel deoxygenator responsive to a desired fuel temperature required within said combustion device.

11. The system as recited in claim 9, wherein removal of dissolved oxygen increases with the desired temperature of fuel entering the combustion device such that the amount of dissolved oxygen removed from the fuel is maintained at a level that substantially prevents generation of insoluble materials.

12. The system as recited in claim 9, wherein said heating device brings to a supercritical state at least a portion of the fuel prior to entering said combustor device.

13. The system as recited in claim 9, wherein said combustion device comprises part of a gas turbine engine.

14. The system as recited in claim 9, wherein said fuel deoxygenator comprises a permeable membrane and an oxygen partial pressure differential across said permeable membrane for drawing oxygen from the fuel.

* * * * *